United States Patent [19]

Bansal et al.

[11] Patent Number: 5,587,647
[45] Date of Patent: Dec. 24, 1996

[54] DUAL OUTPUT SYNCHRONOUS-INDUCTION STARTING/GENERATING SYSTEM

[75] Inventors: Madan L. Bansal; Jayant G. Vaidya, both of Rockford, Ill.

[73] Assignee: Sundstrand Corporation, Rockford, Ill.

[21] Appl. No.: 497,036

[22] Filed: Jun. 30, 1995

[51] Int. Cl.[6] .................................................. H02P 9/00
[52] U.S. Cl. .................... 322/45; 322/46; 322/47; 290/6; 290/31
[58] Field of Search .................... 322/45, 47, 32; 290/6, 31

[56] References Cited

U.S. PATENT DOCUMENTS

| | | | |
|---|---|---|---|
| 4,401,938 | 8/1983 | Cronin | 322/29 |
| 4,447,737 | 5/1984 | Cronin | 290/6 |
| 4,473,752 | 9/1984 | Cronin | 290/38 R |
| 4,663,536 | 5/1987 | Roesel, Jr. et al. | 290/7 |
| 4,748,337 | 5/1988 | Raad et al. | 290/31 |
| 4,830,412 | 5/1989 | Raad et al. | 290/31 |
| 4,868,406 | 9/1989 | Glennon et al. | 290/4 R |
| 5,281,905 | 1/1994 | Dhyanchand et al. | 322/32 |

Primary Examiner—Steven L. Stephan
Assistant Examiner—Nicholas Ponomarenko
Attorney, Agent, or Firm—Jeffery J. Makeever

[57] ABSTRACT

An electric power starter generator system comprises a synchronous generator and an induction motor/generator mutually coupled to a shaft being driven to an external prime mover. The synchronous generator and the induction motor/generator are driven by the shaft at the same speed. The system includes a rectifier/inverter having ac terminals coupled to the output of the induction motor/generator, and dc terminals coupled to a dc bus. This rectifier/inverter allows bi-directional power flow to effectuate both power generation as well as electric start of the prime mover. The synchronous generator is excited by a commonly driven permanent magnet generator and a modulated exciter field control. The induction motor/generator is self-exciting through the rectifier/inverter once a voltage is established on the dc bus. The establishment of this voltage may be accomplished by a battery, or by connection of the synchronous generator's output to the input of the rectifier/inverter through a poly-phase contactor. This contactor also allows cross connection of either machine to either distribution bus if one of the machines were to fail, or if the loading on that particular bus became excessive.

13 Claims, 3 Drawing Sheets

1

DUAL OUTPUT SYNCHRONOUS-INDUCTION STARTING/GENERATING SYSTEM

FIELD OF THE INVENTION

The instant invention relates generally to electric power generating systems, and provides a hybrid dual output system utilizing commonly driven synchronous and self-excited induction generators to produce DC and variable frequency AC electric power.

BACKGROUND ART

As aircraft rely more and more on electrical and electronic devices, both for traditional control and communications as well as for flight surface actuation and control on modern fly-by-wire systems, the size and reliability of the electric power generation system must increase to meet these increased utilization requirements. These increasing requirements are typically met through the use of larger generators. However, as the physical size of a generator increases to meet the increased output power requirements, the slower the generator is capable of rotating due to increased stresses and critical speed of the physically larger rotor. Since the speed and size of a generator are inversely related, the actual size of the generator prohibitively increases with the decrease in speed.

This problem is compounded when it is realized that typical electric power generation systems include either generator input speed or output power conversion devices to produce constant frequency ac power at the full aircraft load system rating. This fact is significant because much of the constant frequency power is simply converted to dc power to supply dc loads, or is used by equipment which does not require constant frequency power. Therefore, the extra weight required for the speed or power conversion equipment to produce this quantity of high quality, constant frequency power is to a large degree unneeded. Additionally, since all of the electric power is coupled through the constant frequency bus, any disturbance induced on any downstream distribution bus will be reflected back through this constant frequency bus to all the loads. Additional filtering and scrubbing techniques may be employed to isolate and remove a portion of the disturbance, but this increases the cost and weight of the system.

For these reasons several modern power generation and distribution networks utilize an architecture which segregates the loads into "power quality" and "power type" busses. In this way a physically smaller, higher speed, variable frequency generator may be employed to generate the gross amount of power required on the aircraft. A portion of this variable frequency power is then utilized directly by electrical loads which are not input frequency dependent. Another portion of this power is convened to dc power through a rectifier for use by dc loads, while still another portion of the power is converted to constant frequency power for those loads requiring such high quality power. The result of this architecture is a system which weighs less than a conventional system. Part of the weight reduction is due to the reduced size of the constant frequency power converter, and part is due to the reduced size of the variable speed generator which operates at a higher speed than the conventional constant frequency generator.

This type of system, however, still suffers from the distortion coupling problem of the traditional systems due to the common link of the variable frequency ac bus. An architecture which solves this coupling problem is one which utilizes at least two separate generators, one to supply the ac power and one to supply the dc power. In this way, any distortion induced by, for example, the rectification of the ac output to form a dc output is not coupled back to the variable frequency ac bus. Additionally, loading and faults on one bus do not effect the ability of the other bus to supply the required amount of power. One such system is disclosed in U.S. Pat. No. 4,447,737, which issued on May 8, 1984 to Cronin.

The Cronin system utilizes an induction generator to supply the ac loads and a synchronous permanent magnet generator to supply the dc loads. This system also includes a third synchronous permanent magnet generator which is required to provide excitation to the main induction generator, or, alternatively, to power an ac bus. While this system does not suffer from the coupling problem described above, it does require a spur gear arrangement to drive the separate machines at different speeds. This additional hardware adds weight and cost to the system while reducing overall reliability. Additionally, this system utilizes an induction generator to supply the main ac distribution buses. However, the output power quality of an induction machine is adversely affected during reactive loading conditions. Since typical electrical systems are required to supply power over a range of 0.75 pf lagging to 0.95 pf leading, with motor starting requirements of 0.40 pf lagging, the use of an induction machine to supply main ac power may well be problematic. Also, since many system fault conditions exhibit essentially reactive loading characteristics, an induction generator may not be capable of clearing these faults on the ac bus within acceptable specification limits.

The continuing trend of increased reliance on electrical devices, in addition to requiring that the generating system generate more power, requires that the generating system perform electronic engine starting as well. Many prior systems allowing for electric start of the engines utilize a dedicated starter motor, typically powered by the battery and possibly by an inverter, to generate torque to start the engine. However, this type of arrangement results in a piece of hardware which, although used at the start of the engine, must be carried for the entire flight cycle during which time it is essentially surplusage. The added weight of this additional equipment increases the overall aircraft cost due to increased fuel burn, maintenance, and reliability costs.

The instant invention is directed at overcoming these power generation and engine starting problems known with the prior art systems.

SUMMARY OF THE INVENTION

It is the principle objective of the instant invention to provide a new and improved electric power starting and generating system. More specifically, it is the principle objective of the instant invention to provide an electric power starting and generating system having mutually independent dual outputs. It is a further object of the instant invention to provide a combined synchronous-induction starter/generator system utilizing a high speed synchronous generator operating at varying power factors according to the ac loads, and a high speed induction machine operating at nearly unity power factor supplying dc loads during the power generation phase of operation. Further, it is an objective of the instant invention to drive each of these generators by a common shaft at a common, variable speed. It is a further object of the instant invention to provide a self-exciting induction generator which does not require a separate excitation generator during operation. Additionally, it is an object of the instant invention to provide engine starting capability without the need for additional hardware.

An embodiment of the invention which accomplishes these objectives comprises a synchronous generator having a first rotor and a first polyphase stator output coupled to an ac bus, and an induction motor/generator having a second rotor and a second polyphase stator output. The rotors of the two machines are commonly coupled to a shaft which is drivably coupled to an external prime mover. This shaft drives the synchronous generator and the induction motor/generator at a same speed, thereby eliminating a considerable amount of weight attributed to speed changing gearing. The system includes a rectifier/inverter having ac terminals coupled to the second polyphase stator output and dc terminals coupled to a dc bus. This rectifier/inverter allows bi-directional power flow from the induction motor/generator to the dc bus and vise versa.

The system further comprises circuitry for exciting the synchronous generator when the shaft is being driven by the prime mover. This circuitry controls the ac output voltage generated by the synchronous generator to a desired level. To generate the excitation power a permanent magnet generator is coupled to the shaft and driven at said same speed as the synchronous generator and the induction motor/generator. The permanent magnet generator generates an electrical output in response to rotation of said shaft, and a rectifier electrically coupled to the permanent magnet generator generates a dc voltage in response to the permanent magnet generator's electrical output. A voltage regulator sensibly coupled to the ac output voltage of the synchronous generator modulates the dc voltage to an exciter field of the synchronous generator to control its ac output voltage. This output voltage is delivered to the ac distribution bus to supply the variable frequency ac loads. The output may also be coupled through a poly-phase contactor to the rectifier/inverter to allow it to supply the dc distribution bus.

The induction motor/generator is self exciting once a voltage level is established on the dc distribution bus. The rectifier/inverter comprises a plurality of switches and anti-parallel coupled diodes, and operates to excite the polyphase stator of the induction machine from the dc bus by forming an ac excitation wave from the dc voltage on the dc bus. The excitation waveform is at less than synchronous frequency to allow the induction motor/generator to generate electric power. This power is rectified through the rectifier/inverter to supply net power to the dc bus.

Prior to the prime mover running, the rectifier/inverter may be utilized to provide starting of the prime mover by generating an ac starting waveform from dc power on the dc bus, such as an aircraft battery. Once the prime mover starts, the system operates as described above in the generating mode.

Other objectives and advantages will become apparent from the following specification taken in conjunction with the accompanying drawings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
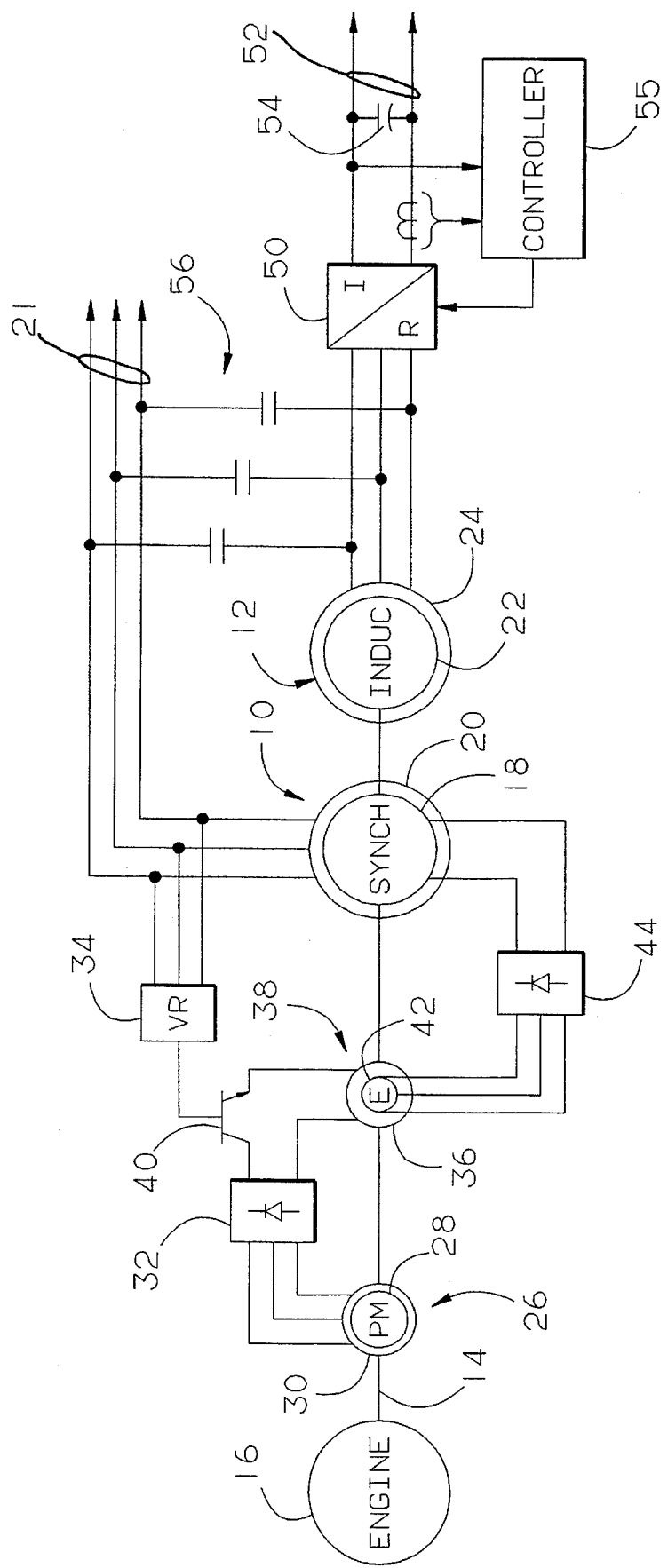
FIG. 1 is a single line schematic diagram illustrating an exemplary system in accordance with the instant invention.

An embodiment of the instant invention is illustrated in single line schematic form in FIG. 1. This electric power system is capable of both the segregated or integrated generation of ac and dc electric power, as well as the performance of an electric start of an engine. As illustrated in FIG. 1, both a synchronous generator 10 and an induction motor/generator 12 are coupled to a shaft 14 driven by a prime mover, such as the aircraft engine 16 in this exemplary embodiment. The synchronous generator 10 has a rotor 18 which is driven by the shaft 14, and a polyphase stator 20. The induction motor/generator 12 also has a rotor 22 which is driven by the shaft 14, and a polyphase stator 24. Since both rotors 18 and 22 are directly coupled to the shaft 14, they are driven at the same speed which, advantageously, removes the added weight of any spur gear arrangement required by the prior art.

Figure 2:
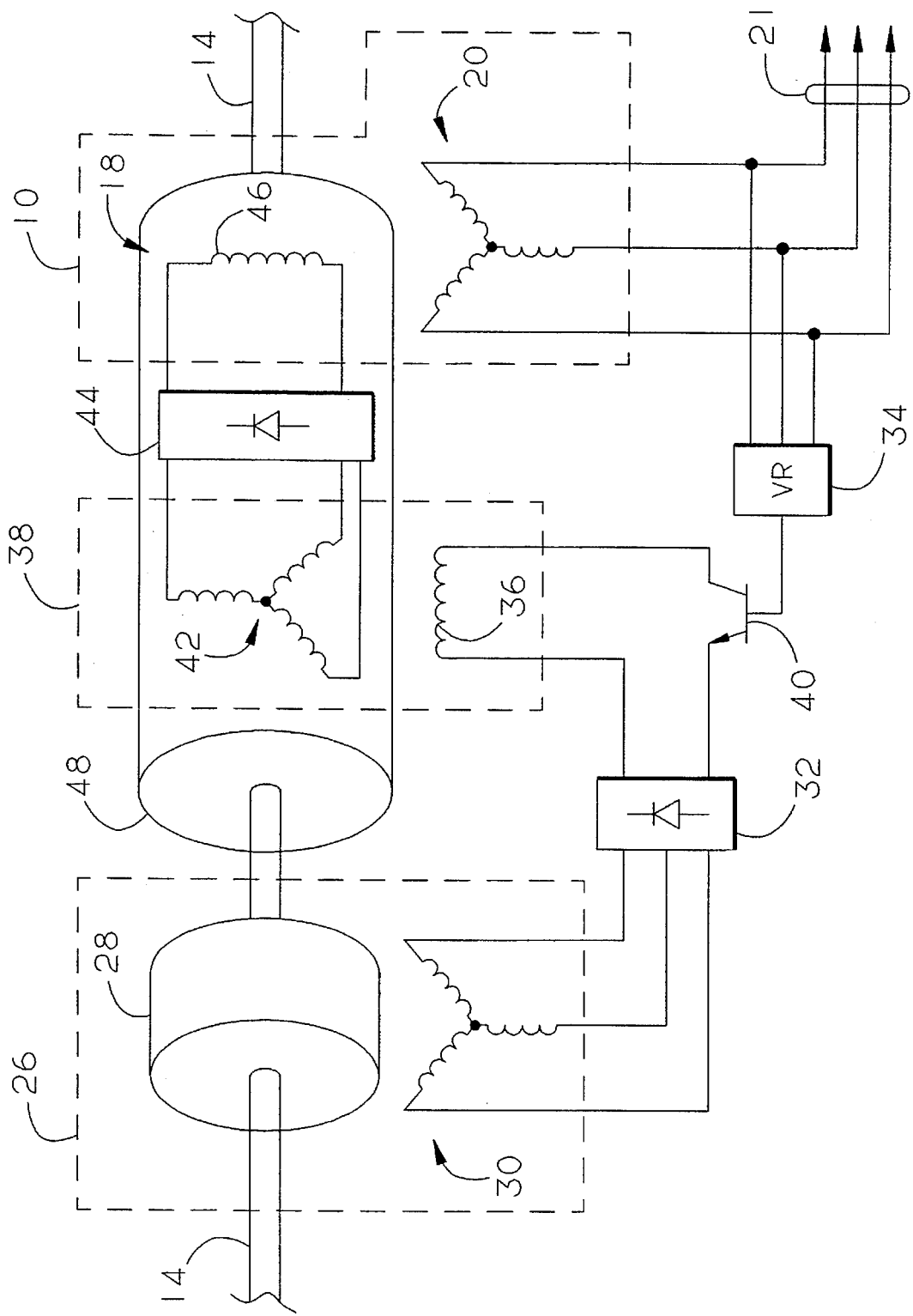
FIG. 2 is an electrical schematic illustration of an aspect of the instant invention illustrated in FIG. 1.

The synchronous generator 10, as illustrated in more detail in FIG. 2, has means for providing it excitation when the shaft 14 is being driven by the engine 16. This excitation means comprises a permanent magnet generator (PMG) 26 having its magnetic rotor 28 coupled to and driven by the shaft 14. As the shaft 14 rotates, a voltage is induced in the wound stator 30 of the PMG 26. This voltage is then passed through rectifier 32. A voltage regulator 34 senses the output voltage of the synchronous generator 10 and modulates the flow of exciter field current to the exciter field 36 of the exciter generator 38 by controlling the opening and closing of switch 40 which completes the circuit connecting the voltage from rectifier 32 through the exciter field 36. A voltage is induced on the wound rotor 42 of the exciter generator 38 as it is rotated by shaft 14. This voltage is then passed through the rotating rectifier 44 to energize the main field winding 46 of the synchronous generator's rotor 18. The resulting rotating field induces a voltage in the wound stator 20 which is output to an ac distribution bus 21. As illustrated in FIG. 2, preferably at least the rotor 42 of the exciter generator 38, the rectifier 44, and the rotor 18 of the synchronous generator 10 are physically housed in the same rotor element 48.

The induction motor/generator 12, as stated above and with reference again to FIG. 1, has a rotor 22 which is coupled to shaft 14 and driven at the same speed as the rotor 18 of the synchronous generator 10. The wound stator 24 of the induction motor/generator 12 is coupled to a bidirectional ac-dc converter (inverter/rectifier) 50 which is also coupled to a dc distribution bus 52. A dc link capacitor 54 is coupled across the dc distribution bus 52 and helps to maintain and smooth the voltage thereacross. A polyphase contactor 56 additionally switchably couples the ac distribution bus 21 to the ac terminals of the inverter/rectifier 50. During typical operation of the system, this contactor 56 is open to allow the segregated generation of ac and dc power.

Figure 3:
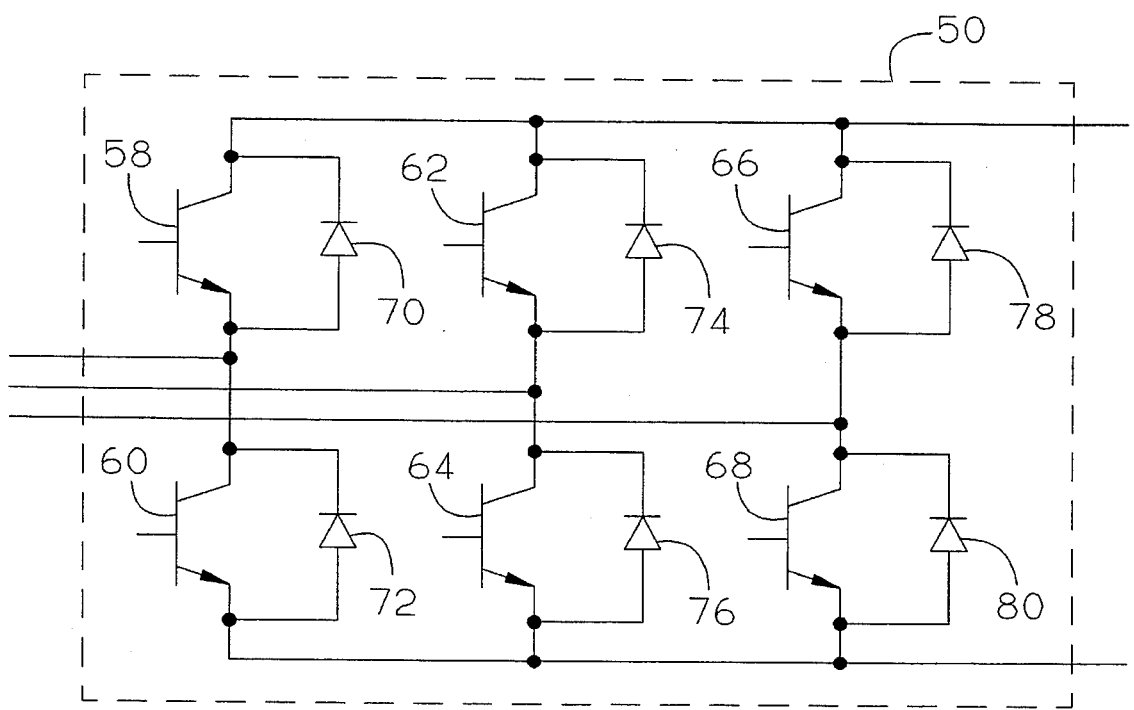
FIG. 3 is an electrical schematic illustration of another aspect of the instant invention as illustrated in FIG. 1.

As illustrated in more detail in FIG. 3, the inverter/rectifier 50 comprises a plurality of switching means, such as transistors 58–68 or other adequate devices, and a plurality of rectifying means, such as diodes 70–80 or other appropriate devices. During operation, the inverter/rectifier 50 allows bi-directional power flow as described hereinbelow.

During the initial start mode of the system, the inverter/rectifier 50 converts dc power available on the dc distribution bus 52 from a battery or other source of dc power to a polyphase ac waveform coupled to the wound stator 24 of the induction motor/generator 12 by known inverter techniques. This creates a revolving flux which sweeps across both the rotor 22 and the stator 24 and induces currents in the rotor 22. This current interacts with the flux to create an electromechanical torque which causes the rotor 22 to rotate. Since the rotor is coupled to the shaft 14 which is also coupled to the engine 16, the engine 16 is also rotated. The frequency of the waveform is increased by the inverter/rectifier 50 to accelerate the engine 16 to its ignition speed while limiting the current draw from the dc source. Once the engine 16 ignites and accelerates to its operational speed, the power generation mode of operation is entered.

During this power generation mode of operation, dc voltage is produced by the induction motor/generator 12 and the inverter/rectifier 50. The inverter/rectifier 50 generates an ac excitation waveform to excite the wound stator 22 of the induction motor/generator 12 generating a rotating flux wave as described above. This excitation waveform is generated by the inverter/rectifier 50 with a frequency less than the speed of the rotor 22, i.e. the rotor is being driven faster than the stator flux resulting from the excitation waveform. With the relative speed between the rotor and the stator flux being negative (rotor faster than flux wave), the induction motor/generator 12 receives mechanical energy from the shaft 14 and transforms it into electrical energy. This energy is rectified by the inverter/rectifier 50 and delivered to the dc bus 52. This energy maintains the dc link capacitor voltage and allows the machine to be self-exciting, i.e. once the induction motor/generator 12 begins to generate power, no other source of dc power is required on the dc bus 52. Part of the energy produced and delivered to the dc bus 52 is used to maintain the stator flux through the switching action of the inverter/rectifier 50. The voltage and current of the dc bus 52 are sensed by rectifier/inverter controller 55 which then adjusts the frequency and excitation current to the wound stator 24 of the induction machine to allow variable power output to be generated at a given speed. This variable power level allows the induction motor/generator 12 to maintain the dc bus voltage at a predetermined level under variable loading conditions at any given operating speed of shaft 14.

If either the synchronous generator 10 or the asynchronous induction motor/generator 12 become inoperative, or if both are operative but the peak load on either the ac 21 or dc 52 busses becomes excessive, the contactor 56 may be closed. In the case of an inoperative generator, closing the contactor 56 will allow the operative generator to power both the ac and dc loads. In the case of a high peak load, closing the contactor 56 will allow parallel operation of the two generator outputs to supply the required power to the peak load. The contactor 56 may also be closed at the beginning of the generation mode of operation to supply the dc bus 52 and the dc link capacitor 54 with the required voltage in the absence of another dc source. Once the dc bus voltage has been established, the inverter/rectifier 50 can excite the induction motor/generator 12 and begin producing electric power. Once the stator flux has been established, the contactor 56 may be opened to maintain isolation between the load busses. If a fault on the dc bus 52 results in a collapse of the voltage, the contactor 56 may be closed to re-establish the voltage and again allow the induction motor/generator 12 and the inverter/rectifier 50 to generate electric power.

Numerous modifications and alternative embodiments of the invention will be apparent to those skilled in the art in view of the foregoing description. Accordingly, this description is to be construed as illustrative only. The details of the structure may be varied substantially without departing from the spirit of the invention, and the exclusive rights to all modifications which come within the scope of the appended claims is reserved.

We claim:

1. An electric power starter generator system, comprising:

a synchronous generator having a first rotor and a first polyphase stator output coupled to an ac bus;

an induction motor/generator having a second rotor and a second polyphase stator output;

a shaft coupled to said first rotor of said synchronous generator and to said second rotor of said induction motor/generator, said shaft being drivably coupled to an external prime mover, said shaft driving said synchronous generator and said induction motor/generator at a same speed thereby; and a rectifier/inverter having ac terminals coupled to said second polyphase stator output and dc terminals coupled to a dc bus, said rectifier/inverter allowing bi-directional power flow therethrough.

2. The system of claim 1, further comprising first means for exciting said synchronous generator when said shaft is being driven by the prime mover, said first means controlling a first ac output voltage resulting therefrom.

3. The system of claim 2, wherein said first means comprises:

a permanent magnet generator coupled to said shaft and driven thereby at said same speed as said synchronous generator and said induction motor/generator, said permanent magnet generator generating an electrical output in response to rotation of said shaft;

a rectifier electrically coupled to said permanent magnet generator, said rectifier generating a dc voltage in response to said permanent magnet generator's electrical output;

a voltage regulator sensibly coupled to said ac output voltage of said synchronous generator, said voltage regulator modulatably coupling said dc voltage to an exciter field of said synchronous generator to control said ac output voltage generated in response thereto.

4. The system of claim 2, wherein said first ac output is additionally switchably coupled by a polyphase contactor to said ac terminals of said said inverter/rectifier, said inverter/rectifier producing a dc voltage in response thereto, said dc voltage charging a capacitor coupled across said dc bus.

5. The system of claim 4, wherein once a voltage is established across said capacitor, said inverter/rectifier operates to excite said second polyphase stator of said induction motor/generator, said induction motor/generator generating a second ac output thereby.

6. The system of claim 5, wherein said polyphase contactor opens to maintain isolation between said first ac output generated by synchronous generator and a second ac output generated by said induction motor/generator, and wherein said polyphase contactor closes if either said first or said second ac outputs are not being generated.

7. The system of claim 1, wherein the prime mover drivably coupled to said shaft is an engine, and wherein said inverter/rectifier operates to generate a third ac voltage from a dc voltage from an external source on said dc bus, said third ac voltage exciting said second polyphase stator of said induction motor/generator causing rotation of said second rotor thereby to rotate said shaft to allow starting of the engine.

8. An aircraft electric power starting and generating system, comprising:

an aircraft engine;

a shaft divably coupled to said aircraft engine;

a synchronous generator having a first rotor directly coupled to said shaft, and a first polyphase wound stator coupled to an ac distribution bus;

an induction motor generator having a second rotor directly coupled to said shaft, and a second polyphase wound stator;

a bi-directional ac/dc converter having a polyphase ac input coupled to said second polyphase wound stator, and a dc output coupled to a dc distribution bus; and wherein said bi-directional ac/dc converter draws power from the dc bus to excite said second stator to cause said second rotor to rotate said shaft to allow starting of said aircraft engine.

9. The system of claim 8, wherein said bi-directional ac/dc converter draws power from the dc bus to excite said second stator to allow said induction motor/generator to generate ac electric power during operation of said engine, said bi-directional ac/dc converter converting said generated ac electric power into dc electric power to supply the dc distribution bus, said induction motor/generator operating in a self exciting generation mode thereby.

10. The system of claim 8, further comprising a polyphase ac contactor switchably coupling said first polyphase wound stator to said second polyphase wound stator.

11. The system of claim 8, further comprising first means for exciting said synchronous generator when said shaft is being driven by said aircraft engine, said synchronous generator generating an ac output in response thereto.

12. The system of claim 11, wherein said first means comprises:

a permanent magnet generator coupled to said shaft and driven thereby, said permanent magnet generator generating an electrical output in response to rotation of said shaft;

a rectifier electrically coupled to said permanent magnet generator, said rectifier generating a dc voltage in response to said permanent magnet generator's electrical output;

a voltage regulator sensibly coupled to said ac output voltage of said synchronous generator, said voltage regulator modulatably coupling said dc voltage to an exciter field of said synchronous generator to control said ac output voltage generated in response thereto.

13. The system of claim 11, wherein said polyphase ac contactor couples said first wound stator to said bi-directional ac/dc converter to produce dc power to charge a capacitor on said dc distribution bus, said polyphase ac contactor thereafter opening to allow said bidirectional ac/dc converter to energize said second stator, said induction motor/generator producing ac electric power thereby, said bidirectional ac/dc converter converting said ac electric power to dc power to supply said dc distribution bus, said induction motor/generator operating in a self exciting generation mode thereby.

\* \* \* \* \*